Feb. 21, 1928.  
C. H. NORRLIN  
1,659,833  
HYDRAULIC CLUTCH FOR DIFFERENTIAL GEARING  
Filed June 11, 1926 5 Sheets-Sheet 1
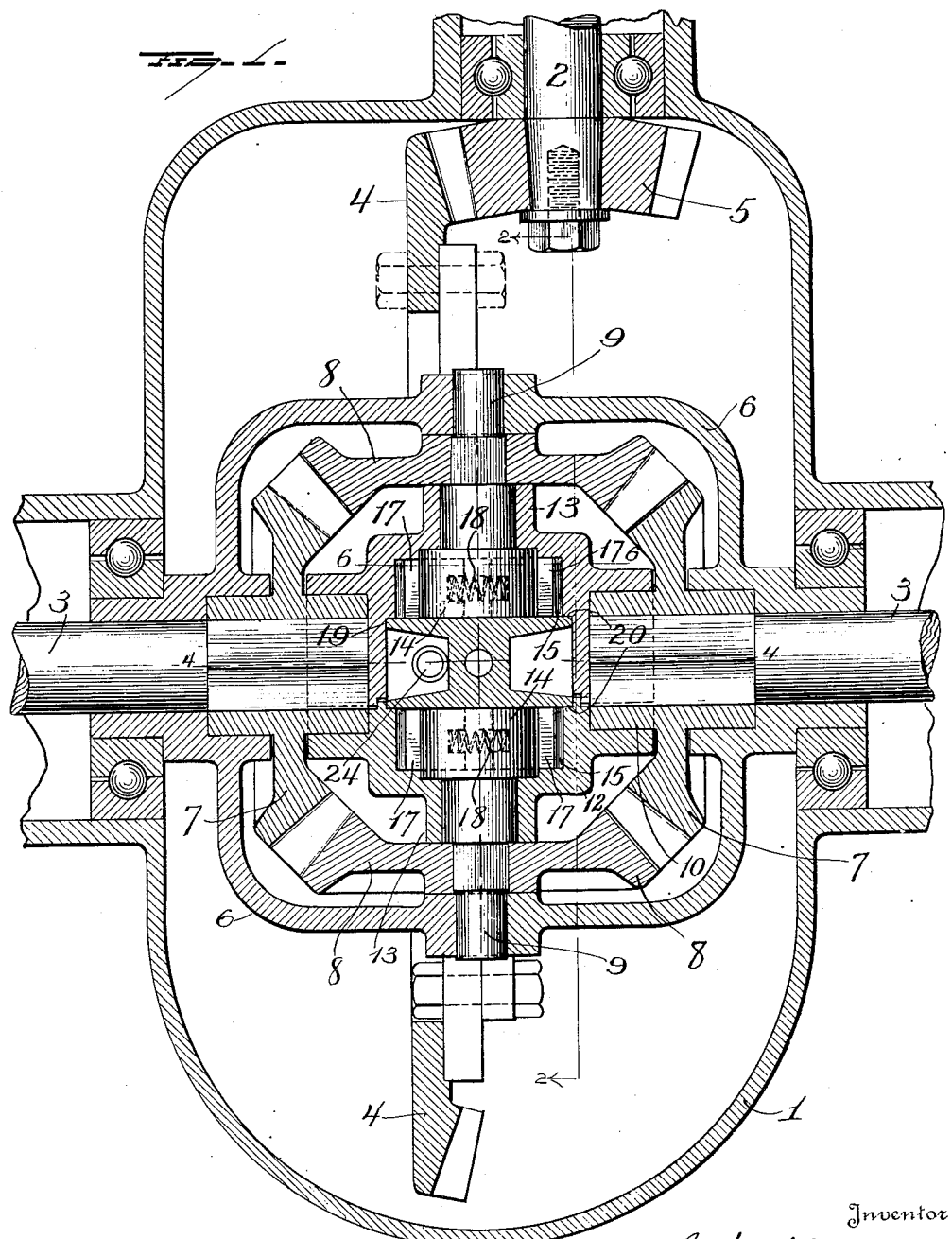
Inventor  
C. H. Norrlin  
By Seymour & Bright  
Attorneys

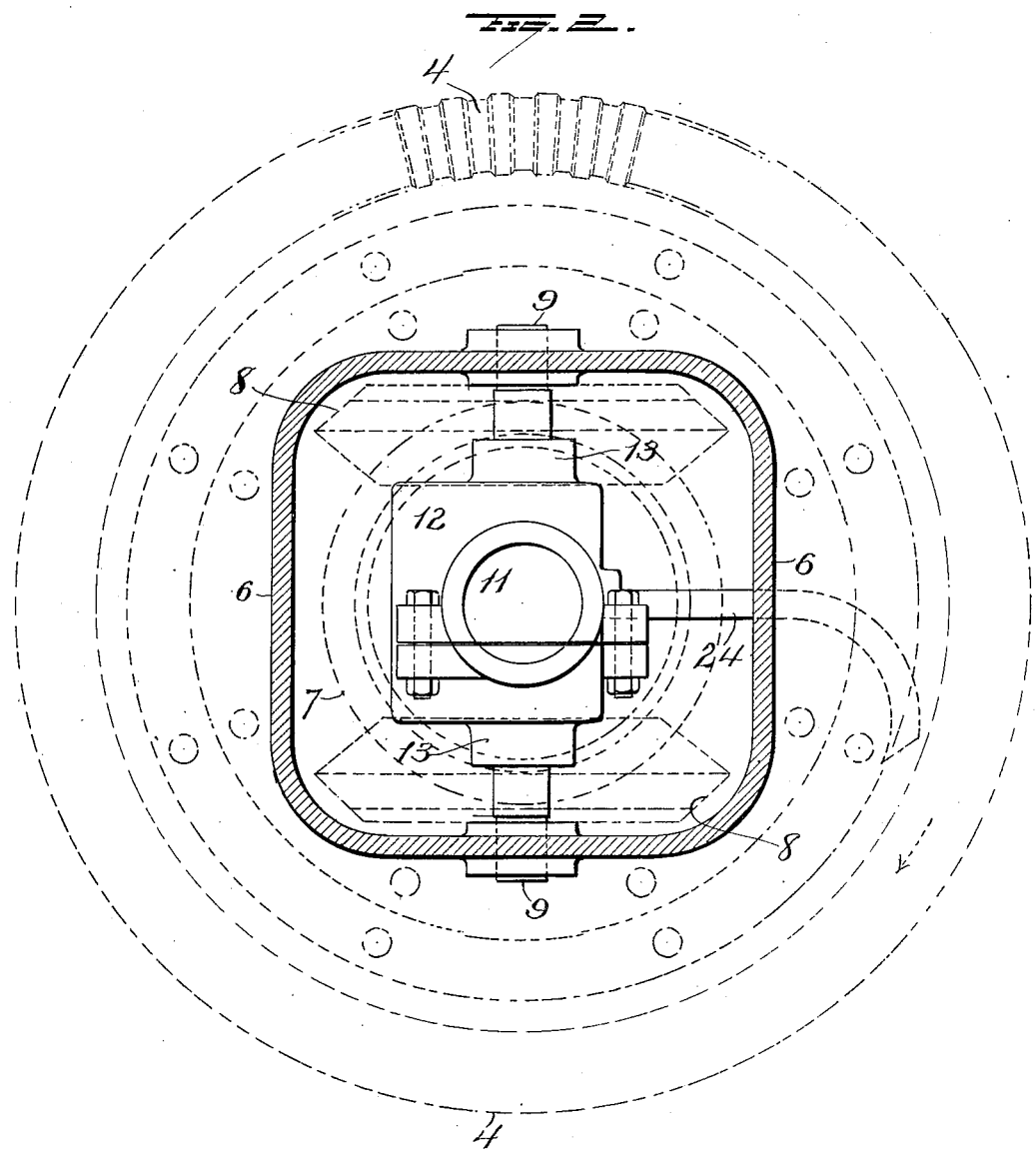

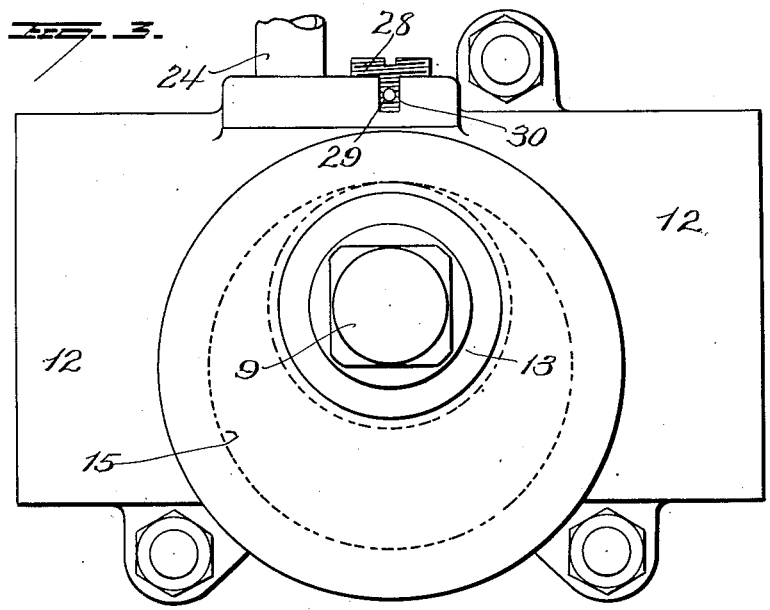
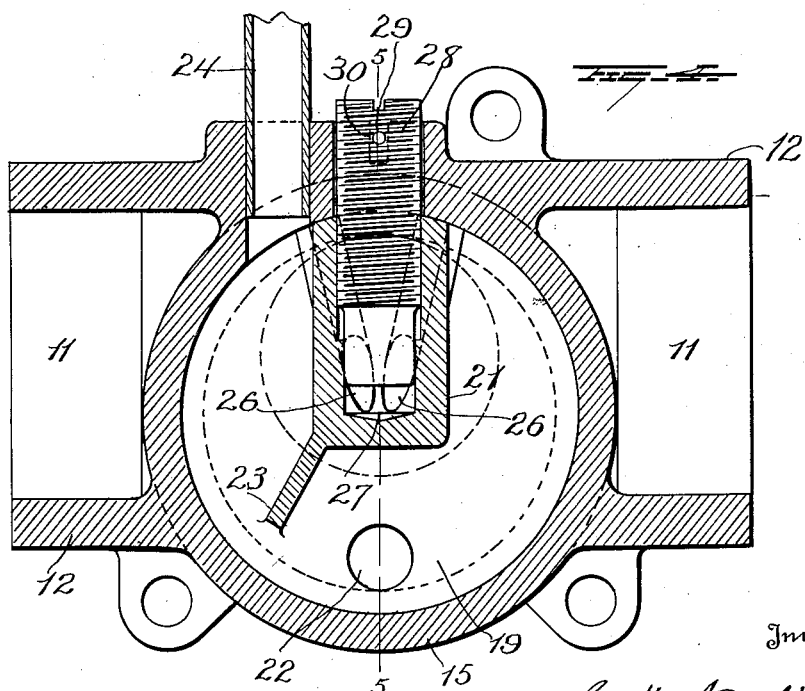

Feb. 21, 1928.
C. H. NORRLIN
HYDRAULIC CLUTCH FOR DIFFERENTIAL GEARING
Filed June 11, 1926
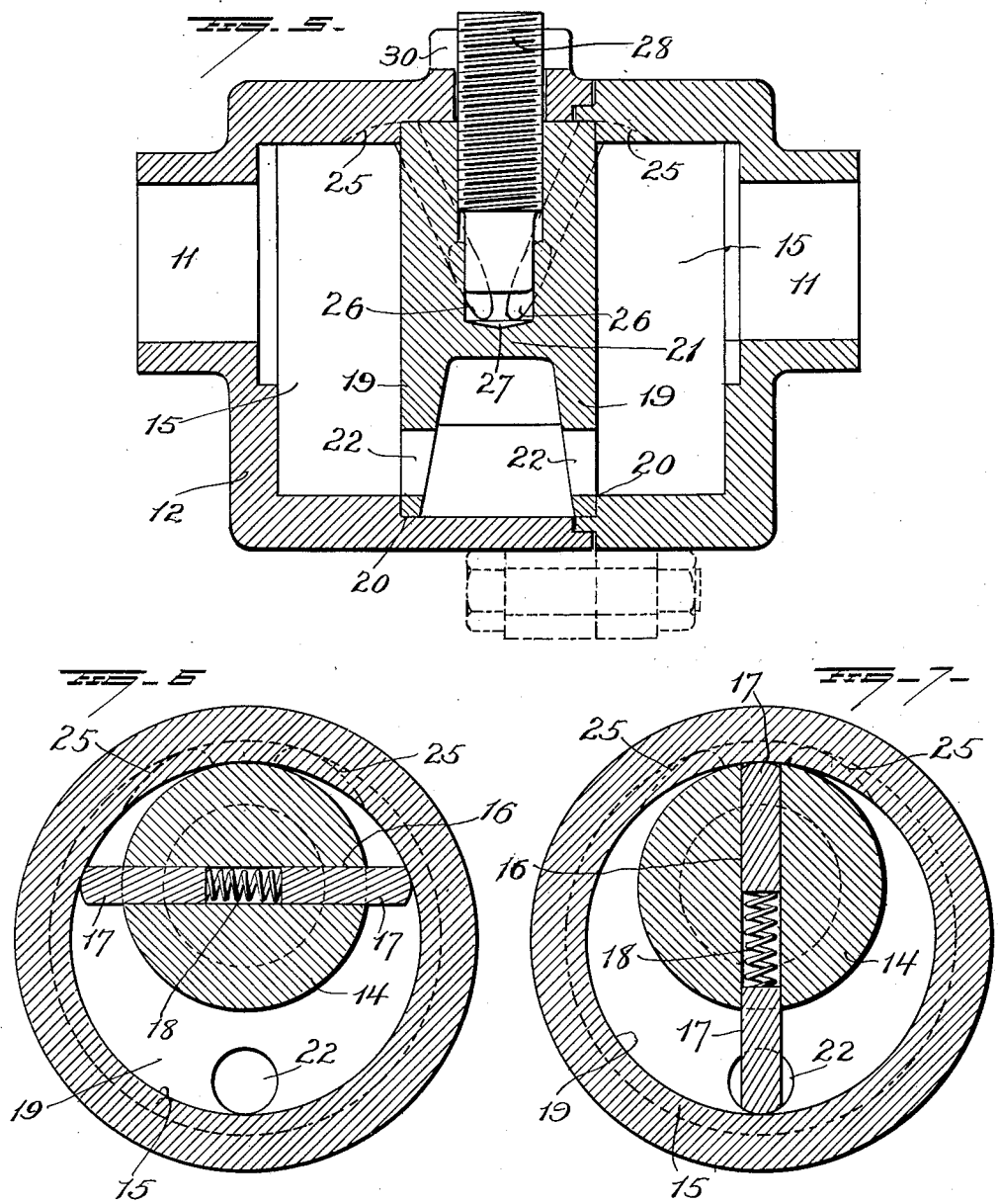

Feb. 21, 1928. 1,659,833
C. H. NORRLIN
HYDRAULIC CLUTCH FOR DIFFERENTIAL GEARING
Filed June 11, 1926   5 Sheets-Sheet 5
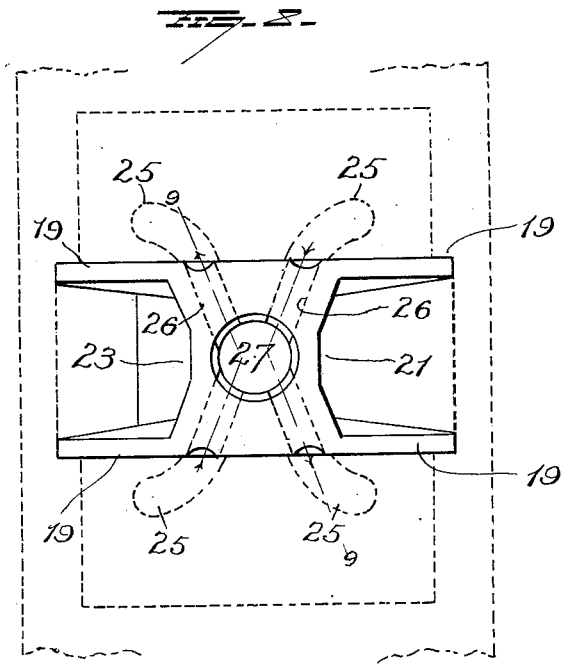
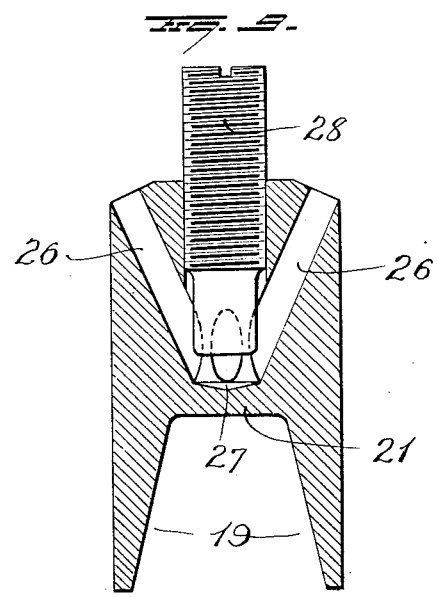
Inventor
C. H. Norrlin
By Seymour & Bright
Attorneys Patented Feb. 21, 1928.

1,659,833

UNITED STATES PATENT OFFICE.

CHARLES H. NORRLIN, OF PHILADELPHIA, PENNSYLVANIA.

HYDRAULIC CLUTCH FOR DIFFERENTIAL GEARING.

Application filed June 11, 1926. Serial No. 115,372.

The object of the present invention is to provide means whereby when the side gears of differential gearing attain abnormally different speeds, so that one differential driven shaft rotates at a very high speed while the other shaft remains approximately at rest, the two side gears will be automatically locked and power will be applied equally through both shafts. While the invention has utility in various fields, it is especially advantageous in automobiles where it will come into action automatically to assist in working the car out of a mudhole or soft place in the road. It is a matter of common observation that, under such conditions, one driving wheel spins without propelling the vehicle and the differential pinions travel over one side gear without any appreciable application of power to the corresponding driving wheel of the vehicle. My invention acts in such emergency to eliminate the free movement of the differential pinions and cause the power to be applied equally to both driving wheels of the vehicle. One embodiment of the invention is illustrated in the accompanying drawing and will be hereinafter fully described, the novel features being particularly pointed out in the appended claims.

In the drawings:

Figure 1 is a horizontal section through a typical differential gearing having my invention embodied therein;

Figure 2 is a section on the line 2—2 of Fig. 1, the clutch casing being shown in end elevation;

Figure 3 is a top plan view of the clutch removed from the differential gearing;

Figure 4 is a section through the clutch on the line 4—4 of Fig. 1;

Figure 5 is a section on the line 5—5 of Fig. 4, with rotor heads 14 removed;

Figure 6 is a detail section on the line 6—6 of Fig. 1;

Figure 7 is a similar section showing the parts in different position;

Figure 8 is a detail elevation of the partition and flow-controlling member;

Figure 9 is a section on the line 9—9 of Figure 8.

Referring particularly to Figures 1 and 2, the numeral 1 designates a gear casing, 2 a main driving shaft, and 3 differential driven shafts, the shafts having suitable bearings in the casing. 4 designates a driving gear meshing with a driving pinion 5 on the inner end of the shaft 2, the gear being fixed to and encircling a differential housing 6. The ends of the shaft 3 extend into the housing 6 and, within the housing, are equipped with differential side gears 7, differential pinions 8 being disposed between and meshing with the side gears. The pinions 8 are carried by posts or studs 9 which are rotatably fitted in the sides of the housing 6, as shown and as will be understood.

It will be noted that the hubs of the gears 7 extend inwardly, as shown at 10, to fit within sockets 11 provided therefor on the ends of the clutch casing 12. It will also be noted that the studs or posts 9 project inwardly beyond the pinions 8 to fit rotatably in bosses 13 on the sides of the casing 12, the inner ends of the posts being annularly enlarged to form rotor heads 14 operating with the cylinders 15 formed eccentrically in the casing 12. The casing 12 is formed in two parts adapted to be bolted together in order to facilitate assembling. The rotor heads 14 are formed with diametric slots 16 in which are slidably mounted pistons 17 which are pressed outwardly and held in close sliding contact with the circular walls of the respective cylinders by expansion springs 18 seated in recesses provided therefor in the inner ends of the pistons. The pistons are of such width that their side edges have close sliding fit with the end walls of the cylinders, the outer end walls being formed by the sides of the housing 12 and the inner end walls being provided by the disks 19. Said disks 19 form the sides of a partition and flow controlling member which is disposed centrally in the clutch casing and is clamped by and between internal shoulders formed on the casing, as shown at 20. The disks are united by an integral core 21 of a general angular formation, shown most clearly in Fig. 4, and through the disks, at one side of the core, are openings 22 to permit flow of oil or other clutching fluid to the respective cylinders 15, while from an inner corner of the core a web 23 projects into the fluid supplied through the inlet 24 so that some of the fluid will be retained in the space between the disks and around the core. It will be understood that the gear casing 1 is filled with oil or grease and that a feed pipe 24 extends from the clutch casing through the differential housing and has its free end bent forwardly within the gear case in the normal direction of rotation so that, as the gearing operates, oil will be taken and delivered into the clutch casing between the disks 19.

Formed in the circular side wall of each cylinder 15, at opposite sides of the point of contact of the rotor head 14 therewith, are recesses 25 to accommodate some of the fluid when the pistons effect circulation thereof. These recesses communicate with passages 26 in the core 21 which lead to a central chamber 27 in the core so that flow is established between the two cylinders and also around the rotor head in each cylinder. In the outer end of the chamber 27 is threaded a plug 28, the inner end of which may be set to extend more or less over the inner ends of the passages 26 and thereby control the rate of flow of the liquid. As this plug will, ordinarily, need no readjustment after being initially set, a pin 29 may be inserted diametrically through its outer end with the ends of the pin fitting in notches 30 in the side of the clutch casing to lock the plug in adjustment.

The operation will be understood readily from the foregoing description, taken in connection with the accompanying drawings. As long as the parts are operating normally, there is no relative rotation of the differential pinions which act merely as couplings between the side gears, except that they rotate sufficiently to absorb slight differences in speed between the driven shafts, as when turning corners. In the normal position, the pistons are disposed as shown in Fig. 6. Should one of the wheels spin, however, as previously suggested, the diametrically opposite differential pinions will rotate in different directions and tend to ride around the relatively idle side gear. Rotation will be transmitted to the rotor heads and the pistons will be caused to travel over and past the ports 22 and force the oil into the contracted space in advance of the piston between the rotor head and the side of the cylinder. See Fig. 7. The oil is thus put under compression and the compression exerts a braking action on the differential pinions so that they will again lock the side gears together and cause the power to be again applied to both wheels of the vehicle. The braking action is applied gradually as some of the oil is permitted to escape through the by-pass 25, 26 to the suction side of the cylinder to be used over again for compression on the next turning movement of the differential pinion and the post 9.

It will be noted that the lubricating oil within the gear case is utilized to attain the clutching action which locks the differential pinions to the side gears. As the differential housing revolves the feed pipe 24 is submerged to take up oil and deliver it to the space between the disks 19 of the partition whereupon the centrifugal action will force it through the ports 22 into the cylinders 15. The by-passes around the rotors and through the core permit the compression on the opposite differential pinions to be equalized, and the adjustment of the plug 28 serves to set a fixed requirement of power to force the oil through the by-pass so that in ordinary operation, as in turning corners, the clutching action will be negligible, but when the difference in the relative speeds of the differential shafts becomes excessive effective clutching occurs.

It is to be understood that the accompanying drawings are illustrative only and not restrictive and that changes may be made in the details of construction and arrangement without departing from the spirit or scope of the invention as the same is defined in the following claims.

Having fully described my invention what I claim as new and desire to secure by Letters-Patent, is:—

1. The combination with a differential gearing including a gear case constituting a reservoir for a fluid, a differential housing revoluble within the gear case, and constantly meshing differential pinions and side gears within the housing, of a fluid-pressure clutch mounted centrally in the housing and operable at times to automatically lock the differential pinions to the side gears, and means carried by the differential housing for transferring fluid from the gear case reservoir to the clutch for operating the latter.

2. The combination with a differential gearing, and a reservoir for fluid enclosing the gearing, of a centrally disposed clutch casing circumscribed by the gearing, said casing including two clutch chambers and a pair of disks separating the clutch chambers, constantly open ports in the disks establishing communication between the clutch chambers, and means for transferring fluid from the reservoir to the space between the disks as the gearing rotates as a unit.

3. In an apparatus of the type described, the combination of a clutch casing having clutch cylinders therein, rotors disposed eccentrically in the cylinders, pistons slidable diametrically through the rotors and in contact with the walls of the cylinders, disks forming the inner walls of the cylinders and provided with ports forming inlets for the cylinders, a core between and connecting the disks, means for supplying fluid to the space between the disks, and by-pass recesses and passages in the walls of the cylinders and in the core establishing communication between the cylinders and between the spaces at opposite sides of the rotors in the cylinders.

4. In an apparatus of the type described, the combination of a clutch casing having clutch cylinders therein, rotors mounted eccentrically in the cylinders and rotatable in opposite directions, pistons slidable diametrically in the rotors, means for delivering fluid to the cylinders, and means for equalizing the compression of the fluid in the cylinders.

5. In an apparatus of the type described, the combination of a clutch casing having clutch cylinders therein, rotors mounted eccentrically in the cylinders and rotatable in opposite directions, pistons slidable diametrically in the rotors, means for delivering fluid to the cylinders, and means for establishing flow between the cylinders and between the spaces in the cylinders at opposite sides of the pistons therein.

6. In an apparatus of the type described, the combination of a clutch casing having clutch cylinders therein, rotors mounted eccentrically in the cylinders and rotatable in opposite directions, pistons slidable diametrically in the rotors, means for delivering fluid to the cylinders, means for establishing flow between the cylinders and between the spaces in the cylinders at opposite sides of the pistons therein, and means for controlling the rate of flow.

7. In an apparatus of the type described, the combination of a clutch casing having cylinders therein, eccentric rotors in the cylinders, pistons slidable diametrically across the rotors, a partition between the cylinders having a space in direct communication with the cylinders, means for supplying fluid to said space in the partition, recesses in the walls of the cylinders at opposite sides of the rotors therein, passages through the partition establishing communication between all said recesses, and a plug fitted in the partition and adjustable across all the passages therein to regulate the flow through the passages and recesses.

8. In an apparatus of the type described, the combination of a clutch casing having cylinders therein, eccentric rotors in the cylinders, pistons slidable diametrically across the rotors, a partition between the cylinders having a space at one side and provided with ports establishing communication between said space and the respective cylinders, the casing having an inlet port opening into said space, and a web projecting partly across said space between the inlet port and the first-mentioned ports.

In testimony whereof, I have signed this specification.

CHARLES H. NORRLIN.